April 9, 1940.   A. J. WEST   2,196,349
OIL REFINER FOR MOTORS
Filed Sept. 14, 1938
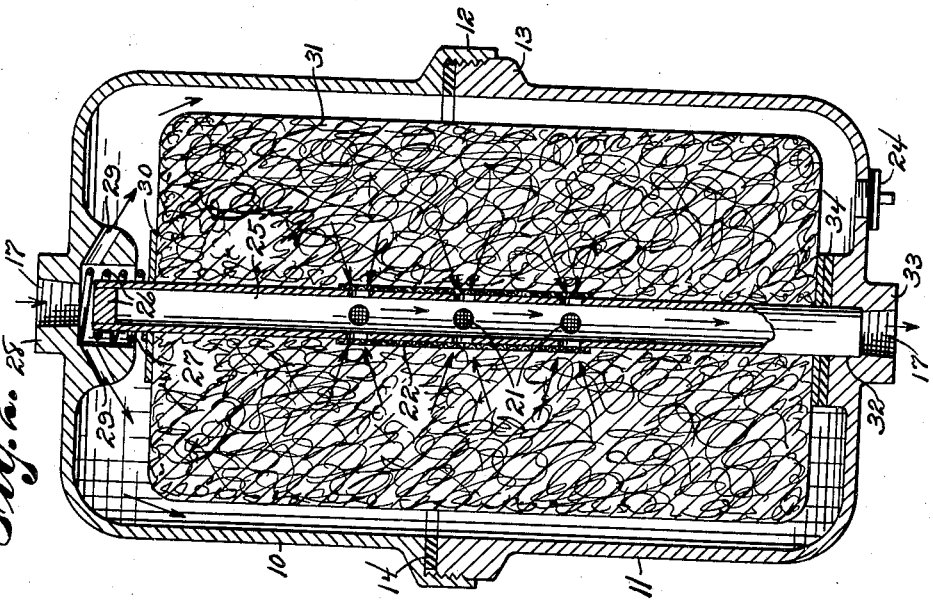
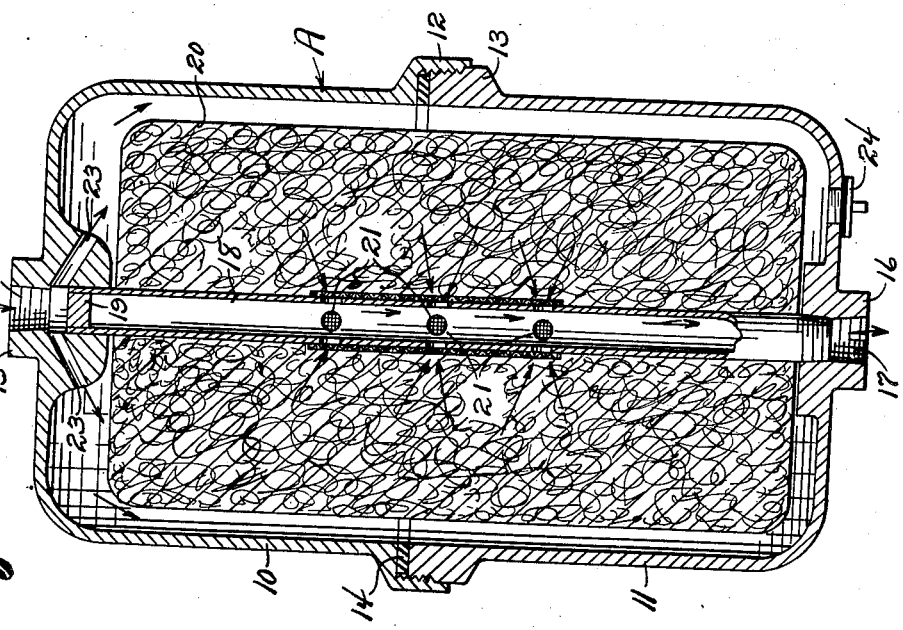
Arthur J. West
INVENTOR
BY Victor J. Evans & Co.
ATTORNEYS Patented Apr. 9, 1940

2,196,349

UNITED STATES PATENT OFFICE 2,196,349

OIL REFINER FOR MOTORS

Arthur J. West, Spokane, Wash.

Application September 14, 1938, Serial No. 229,982

2 Claims. (Cl. 210—112)

The invention relates to an oil refiner for use in the oil supply to a crank case of a motor and more especially to an oil refiner for motors.

A primary object of the invention is the provision of a device of this character wherein oil supplied to a crank case for internal combustion engines will be acted upon during circulation of such oil so that the same will become purified, there being removed all particles of carbon and abrasives and in this way assuring maximum life to the lubricated parts of a motor or engine during the working thereof.

Another object of the invention is the provision of a device of this character, wherein the construction thereof is novel in its make-up in that the flow of oil under pressure will be subjected to a filtering action and in this way purifying the oil as well as removing all particles, such as carbon and abrasives or other solids, the cleansing of the oil being almost entirely free from contamination thereof with the result that the working portions of the motor or engine will not become damaged thereby.

A further object of the invention is the provision of a device of this character, which is simple in its construction, thoroughly reliable and efficient in operation, automatic in the working thereof, readily and easily accessible for cleansing purposes or for replacement of parts, strong, durable, and inexpensive to manufacture and install.

With these and other objects in view the invention consists in the features of construction, combination and arrangement of parts as will be hereinafter more fully described in detail, illustrated in the accompanying drawing, which discloses the preferred and modified forms of embodiment of the invention and pointed out in the claims hereunto appended.

In the accompanying drawing:

Figure 1 is a vertical longitudinal sectional view through the refiner constructed in accordance with the invention.

Figure 2 is a view similar to Figure 1 showing a slight modification of the invention.

Similar reference characters indicate corresponding parts throughout the several views in the drawing.

Referring to the drawing in detail, A designates generally a refiner constructed in accordance with the invention and in this instance with reference to Figure 1 it comprises upper and lower sections 10 and 11, respectively, of a casing. The upper section 10 is formed with an out-struck annular coupling flange 12 being internally threaded for engagement with companion threads externally of an annular shoulder 13 provided on the lower section 11 and in this manner these sections are separately joined with each other. There is provided between the joined ends of the sections 10 and 11 a washer or a sealing ring 14 preferably of rubber although it may be made of any other favorable material having the required inherent sealing qualities on compression thereof for the sealing or closing of the joint between said sections when connected together.

At the outer closed ends of the sections 10 and 11 and centrally thereof are formed the perforated bosses 15 and 16, respectively, the perforation being threaded as at 17. These bosses 15 and 16 extend outwardly and inwardly of the casing constituted by the sections 10 and 11. The outer projected portions of the boss 15 accommodate an oil inlet pipe, not shown, while the outer portion of the boss 16 at the perforation 17 therein accommodates an outlet pipe, not shown.

The inlet and outlet pipes are a part of the oiling system for the circulation of the oil in the crank case of a motor or engine. Modern automobiles are equipped with pumps so that oil under pressure will be directed to all working parts while certain types of automobiles depend on the splash and low pressure oil systems. However, practically all automobiles with respect to their motors have oil pumped under pressure and this pressure is anywhere up to thirty-five pounds pressure and on the motor using pressure there is a point where the oil pressure line can be tapped and through a flexible oil hose the oil is taken to the inlet connection of the oil refiner. After filtering through the refiner, the oil is drained back through a flexible hose or copper tubing into the crank case. In other words, the oil is pumped by the pressure pump, which is a part of the mechanism of the automobile, from the oil reservoir in the crank case of the motor to the point where the line is tapped, the filter being in parallel with the direct oil line from the pump to the crank case and a very small part of the pressure stream is diverted through the line to the crank case refiner. Such a small amount of pressure diverted does not appreciably affect the oil pressure of the motor. However, the oil is worked over and over through the refiner and kept clean continuously.

Threaded in the innermost portion of the boss 16, in the perforation 17 thereof, is a tubular column 18, its lower end opening through the boss 16 while the opposite upper end is closed as at 19 and is accommodated within the innermost portion of the boss 15 at the top or upper section 10. About this column tube 18 is a filtering pack or cartridge 20, the tube 18 being provided with apertures 21 covered by a wire mesh screen cylinder 22 which snugly fits about the tube 18.

The innermost portion of the boss 15 of the section 10 of the casing has openings into the perforation in said boss and into the casing A downwardly divergent passages 23, so that oil passing through the perforations in the boss 15 will be distributed through the passages 23 about the pack or cartridge 20, then flowing through the said pack or cartridge and having passage through the perforations 21 into the columnar tube 18, then discharged or delivered to the perforations in the boss at 16.

The section 11 of the casing 8 at the outer closed end thereof has detachably fitted therein a drain plug 24 to permit of the draining of the casing 8 of sediment or other foreign matter collected therein.

The pack or cartridge 20 is of an external diameter less than the diameter of the casing A internally thereof. The pack or cartridge 20 is extended between the innermost portions of the bosses 15 and 16 and surroundingly embraces the columnar tube 18 in its mounting within the casing.

A thorough filtering of the oil during circulation thereof under force or pressure will be had and thus all impurities, foreign matter, abrasives or other solid particles will be removed from the oil in that the pack or cartridge 20 will thoroughly cleanse the oil during circulation.

In Figure 2 of the drawing there is shown a slight modification of the invention, wherein the columnar tube 25 has its upper end, being closed at 26, loosely received in a socket 27 in the innermost portion of the boss 28 and this socket accommodates a coiled tension spring 29 acting upon a seating disk 30 which is held under tension against the pack or cartridge 31, the other or lower end of the tube 25 socketed at 32 in the boss 33. Between this boss 33 and the pack or cartridge 25 next thereto is a seating disk or ring 34.

What is claimed is:

1. A casing having an inlet and an outlet remote from each other, a perforated tube within said casing and having one end communicating with the outlet and the other end closed to the inlet, a screen covering the perforations of said tube, a filtering pack about said tube and extended a major portion of the length thereof, and a drain plug in the casing at the lowermost part thereof, said casing having a socket for the closed end of the tube, and resilient means in said socket and acting upon the pack to hold the same seated with respect to the outlet.

2. A casing having an inlet and an outlet remote from each other, a perforated tube within said casing having one end communicating with the outlet and the other end closed to the inlet, a screen covering the perforations of said tube, a filtering pack about said tube and extended a major portion of the length thereof, and a drain plug in the casing at the lowermost part thereof, said casing having a socket at the inlet for the closed end of the tube and holding the latter aligned and in fitting relation to the outlet for communication therewith.

ARTHUR J. WEST.